United States Patent
Su

(10) Patent No.: US 10,211,042 B2
(45) Date of Patent: Feb. 19, 2019

(54) DOUBLE-ENDED HIGH INTENSITY DISCHARGE LAMP AND MANUFACTURING METHOD THEREOF

(71) Applicant: Robert Su, Chino, CA (US)

(72) Inventor: Robert Su, Chino, CA (US)

(73) Assignee: Allstate Garden Supply, Chino, CA (US)

( * ) Notice: Subject to any disclaimer, the term of this patent is extended or adjusted under 35 U.S.C. 154(b) by 0 days.

(21) Appl. No.: 15/888,066

(22) Filed: Feb. 4, 2018

(65) Prior Publication Data

US 2018/0158667 A1 Jun. 7, 2018

Related U.S. Application Data

(63) Continuation-in-part of application No. 15/838,274, filed on Dec. 11, 2017, which is a continuation of application No. 15/368,654, filed on Dec. 4, 2016, now Pat. No. 9,875,886.

(51) Int. Cl.

| H01J 61/62 | (2006.01) |
|---|---|
| H01J 61/82 | (2006.01) |
| A01G 9/20 | (2006.01) |
| H01J 9/24 | (2006.01) |
| H01J 9/39 | (2006.01) |
| H01J 9/32 | (2006.01) |
| H01J 61/36 | (2006.01) |
| H01J 61/34 | (2006.01) |
| H01J 61/26 | (2006.01) |

(52) U.S. Cl.
CPC .............. *H01J 61/827* (2013.01); *A01G 9/20* (2013.01); *H01J 9/247* (2013.01); *H01J 9/323* (2013.01); *H01J 9/39* (2013.01); *H01J 61/26* (2013.01); *H01J 61/34* (2013.01); *H01J 61/366* (2013.01)

(58) Field of Classification Search
CPC .......... H01J 61/827; H01J 61/26; H01J 61/34; H01J 9/323; H01J 9/39; H01J 9/247; H01J 61/366; A01G 9/20
See application file for complete search history.

(56) References Cited

U.S. PATENT DOCUMENTS

| 3,662,203 | A | * | 5/1972 | Kuhl | H01J 5/48 313/25 |
|---|---|---|---|---|---|
| 4,479,071 | A | * | 10/1984 | T'Jampens | H01J 61/40 313/25 |
| 4,737,677 | A | * | 4/1988 | Whitten | H01J 61/34 313/25 |
| 5,138,227 | A | * | 8/1992 | Heider | H01J 61/368 313/332 |
| 5,209,689 | A | * | 5/1993 | Griffin | H01J 9/247 445/27 |
| 7,224,107 | B2 | * | 5/2007 | Moench | F21V 7/0025 313/114 |
| 9,824,878 | B1 | * | 11/2017 | Su | H01J 61/827 |
| 9,875,886 | B1 | * | 1/2018 | Su | H01J 61/827 |
| 2009/0296400 | A1 | * | 12/2009 | Ikeda | H01J 61/0732 362/263 |

* cited by examiner

*Primary Examiner* — Donald L Raleigh
(74) *Attorney, Agent, or Firm* — Raymond Y. Chan; David and Raymond Patent Firm

(57) ABSTRACT

A double-ended high intensity discharge lamp includes a luminous tube and reflective layer covering at a reflective portion provided on at least a portion of aid luminous tube for reflecting light emitted from an illuminator supported in the luminous tube towards the reflective portion to project towards another opposing side of the luminous tube.

15 Claims, 4 Drawing Sheets

A—A

B—B

DOUBLE-ENDED HIGH INTENSITY DISCHARGE LAMP AND MANUFACTURING METHOD THEREOF

CROSS REFERENCE OF RELATED APPLICATION

This application is a Continuation-In-Part application that claims the benefit of priority under 35U.S.C. § 120 to a non-provisional application, application number 15/838,274, filed Dec. 11,2017, which is a Continuation application that claims the benefit of priority under 35U.S.C. § 120 to a non-provisional application number 15/368,654, filed Dec. 4, 2016. The afore-mentioned patent applications are herewith by references in their entities.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to lightening device, and more particularly to a double-ended high intensity discharge lamp and manufacturing method thereof, which can provide a ceramic metal halide lamp or a high-pressure sodium lamp.

Description of Related Arts

Double-ended high intensity discharge lamps, such as HIPS, MH, and LED, are commonly used in large area lighting application, and especially for the indoor growers, the above mentioned HID lamps are commonly used to grow corps without using sunlight indoors. In the current market, the ceramic metal halide lamps are provided in the market which can be used to provide efficient crop light that allows more harvest for less power. Compared with the other HID lamps, the ceramic metal halide lamps, for example, can be operated at higher temperature which is adapted to boost performance and quality-of-light characteristics, such as lumen maintenance, lamp color-shift and spread stability, color rendering index, and dimming.

However, the ceramic metal halide lamps have several drawbacks. Since the ceramic metal halide lamps are operated under a high temperature, throughout their lifetime, the light output of the ceramic metal halide lamps is gradually reduced, and the power consumption is gradually increased. Therefore, 315 W ceramic metal halide lamps are commonly used and limited in our daily life, and a higher wattage ceramic metal halide lamp is highly desired to provide to satisfy our daily life requirement.

Also, the conventional double-ended high intensity discharge lamp has to be mounted on a shell or a housing for fastening the double-ended high intensity discharge lamp and spotlighting to a certain place in the process of being used. But the housing must satisfy the needs of light-reflection and heat-dissipation. So, the housing is taken too much space with complicate structure and high cost.

The conventional double-ended high intensity discharge lamp comprises a hard glass bulb, which is easily to be broken by hitting or heating, an illuminator inside the bulb, and a plurality of electrical elements mounted outside the glass bulb to be threatened by being damaged. It is worth to mention that the illuminator is connected by the electrical elements with outside, so the electrical elements are suffered through heat changing in the bulb which effects the lifetime by stretching wires of the electrical elements.

In addition, light is emitted from the illuminator from all direction. Therefore, generally, only half of the light emitted from the double-ended high intensity discharge lamp installed to the ceiling is directing downwards for growing corps or other plants, while another half of the light is generally directing upwards to the ceiling and wasted.

SUMMARY OF THE PRESENT INVENTION

The invention is advantageous in that it provides a double-ended high intensity discharge lamp and manufacturing method thereof, wherein the high intensity discharge lamp is capable of spotlighting without any lamp housing or shell to directly using for lightening.

Another advantage of the invention is to provide a double-ended high intensity discharge lamp and manufacturing method thereof, wherein the high intensity discharge lamp comprises at least one electrical member securely fastened in a luminous tube to enhance the efficiency of operation and avoid damages to the electrical member.

Another advantage of the invention is to provide a double-ended high intensity discharge lamp and manufacturing method thereof, wherein the high intensity discharge lamp comprises at least one illuminator supported inside the luminous tube with a distributor to increase the stability of connection between the illuminator and electrical member.

Another advantage of the invention is to provide a double-ended high intensity discharge lamp, wherein the electrical member further comprises at least two terminals which are permanently fixed in two sealing ends of the luminous tube to seal the luminous tube and decrease stretching damage by heat expansion and contraction.

Another advantage of the invention is to provide a double-ended high intensity discharge lamp, wherein the luminous tube is made of quartz which has non-friable performance to protect the illuminator therein.

Another advantage of the invention is to provide a double-ended high intensity discharge lamp, wherein the luminous tube is further covered with a reflecting layer to form reflection region to gather light from the illuminator to spotlight.

The invention is advantageous in that it provides a double-ended high intensity discharge lamp and manufacturing method thereof, wherein the high intensity discharge lamp comprises at least two illuminators serially connected with each other to provide a high wattage lamp without alter the overall structure for the conventional double-ended high intensity discharge lamp.

Another advantage of the invention is to provide a double-ended high intensity discharge lamp, wherein the illuminators are 315 W high intensity discharge lamp, so a total wattage of all illuminators is 945 W.

Another advantage of the invention is to provide a double-ended high intensity discharge lamp and manufacturing method thereof, wherein the high intensity discharge lamp comprises a plurality of U-shaped connectors arranged on two opposed ends of each illuminators to provide buffering clearances and buffering forces for connections between two illuminators.

Another advantage of the invention is to provide a double-ended high intensity discharge lamp and manufacturing method thereof, wherein the high intensity discharge lamp comprises at least two getters attached on one of two U-shaped connectors between the two illuminators to absorb excess hydrogen, so as to protect the functions of the double-ended high intensity discharge lamp.

Another advantage of the invention is to provide a double-ended high intensity discharge lamp and manufacturing method thereof, wherein the high intensity discharge lamp comprises at least two ring-shaped retainers extended through one of the U-shaped connectors to an adjacent U-shaped connector to bias against an inner wall of the luminous tube to support the illuminators arranged along a central line of the luminous tube.

Another advantage of the invention is to provide a double-ended high intensity discharge lamp, wherein two opposed ends of the luminous tube are sealed and a vacuum space is formed inside the luminous tube to protect functions of the illuminators.

Another advantage of the invention is to provide a double-ended high intensity discharge lamp, wherein the overall structure of the double-ended high intensity discharge lamp doesn't nor alter in order to satisfy the above mentioned advantages, so there is no need to purchase new ballasts and fixtures for replacing the original lamp device into the present invention.

Another advantage of the invention is to provide a double-ended high intensity discharge lamp and manufacturing method thereof, wherein the portion of light emitted from one side of the lamp is redirected to another side of the lamp to combine with the light emitted from that side so as to utilize as much as light emitted from the illuminator as possible.

Additional advantages and features of the invention will become apparent from the description which follows, and may be realized by means of the instrumentalities and combinations particular point out in the appended claims.

In accordance with one aspect of the invention, the present invention provides a double-ended high intensity discharge lamp, comprising:

a luminous tube;

at least two illuminators serially connected with each other deposed inside the luminous tube; and at least one ring-shaped retainers arranged between two illuminators to support said illuminators located along a central line of the luminous tube.

In accordance with one aspect of the invention, the present invention comprises a manufacturing method for a double-ended high intensity discharge lamp, comprising following steps:

(1) Arrange at least two serially connected illuminators inside an interior of a luminous tube.

(2) Seal two ends of luminous tube by a press sealing technique.

(3) Extract out the gas inside the luminous tube to form an eyelet at a central portion of the luminous tube.

In accordance with one aspect of the present invention, the foregoing and other objects and advantages are attained by a double-ended high intensity discharge lamp, comprising:

a luminous tube, which is covered by a reflecting layer;

at least one electrical member securely fastened inside the luminous tube; and at least one illuminator supported inside the luminous tube with a distributor connected with the electrical member to receive power and supply the illuminator to provide light reflected by the reflecting layer to lightening at certain region.

According to one embodiment of the present invention, the reflecting layer is formed in arch-shape on the inner surface of the luminous tube.

According to one embodiment of the present invention, the luminous tube has an emitted angel to spotlight by covered by the reflecting layer.

According to one embodiment of the present invention, the terminals of the electrical member is sealed in the sealing ends by melting the luminous tube to permanently fasten the electrical member in the luminous tube.

According to one embodiment of the present invention, the sealing ends are preferably in smaller size than the other portion of the luminous tube so as to form the arch-shape of the luminous tube.

According to one embodiment of the present invention, the distributor is connected with the illuminator and one of the terminals to distribute the stress of stretch the illuminator while changing temperature in the luminous tube.

In accordance with another aspect of the invention, the present invention provides a method of manufacturing the double-ended high intensity discharge lamp, comprising the steps of:

A. preparing a luminous tube in vacuum;

B. forming a reflecting layer on the luminous tube;

C. arranging the illuminator with the connector, the getter, the retainer and the distributor inside the luminous tube; and D. melting to seal the terminals in the sealing ends of the luminous tube.

According to one embodiment of the present invention, after the step (d), the manufacturing method further comprises a step of:

E. extracting gas inside the luminous tube.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
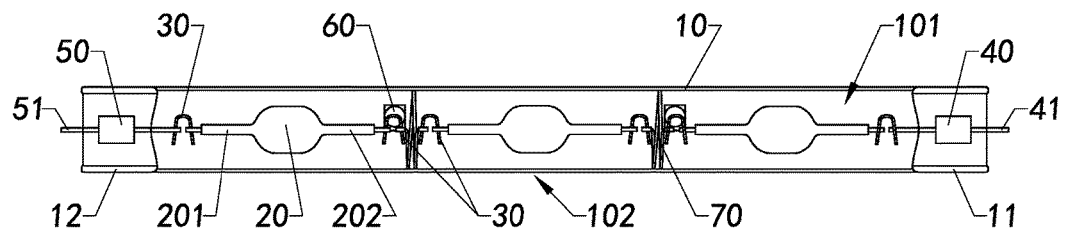
FIG. 1 is a sectional view of a double-ended high intensity discharge lamp according to a first preferred embodiment of the present invention.

Referring to FIG. 1 of the drawings, a double-ended high intensity discharge lamp according to a first preferred embodiment of the present invention is illustrated, wherein the double ended high intensity discharge lamp comprises a luminous tube 10 having two sealed ends 11, 12 to define an interior 101, at least two illuminators 20 serially connected arranged along a central line Y of the luminous tube 10 and deposed inside the interior 101, and at least four U-shaped connectors 30 adapted to provide electrical connection between each of the illuminators 20.

Accordingly, each of the illuminators 20 is arc-tube having a wall formed of a ceramic or other suitable material, wherein each of the illuminators 20 has two opposed ends 201, 202 to receive current from the U-shaped conductors 30. The illuminators 20 are surrounded by the luminous tube 10, and two sealed ends 11, 12 of the luminous tube 10 are selectively connected with a source of power, such as voltage, wherein each of the illuminators 20 are conventional ceramic metal halide lamps, which comprises an ionizable fill disposed in an interior space of the illuminator 20, the ionizable fill comprising an inert gas and a halide component, and two electrodes positioned within the discharge vessel so as to energize the fill when an electric current is applied thereto. It is worth to mention that each of the illuminators 20 is a 315 W ceramic metal halide lamp, so if three of the illuminators 20 are serially connected with each other, the total energy used of the present invention is 945 W.

It is worth mentioning that the interior of the luminous tube 10 is a vacuum space to insulate the illuminators 20, so after the two sealed ends 11, 12 are sealed by press sealing technique, the gas inside the interior of the luminous tube 10 is extracted out to form the vacuum space from a central of the luminous tube 10 to from an eyelet. The press sealing techniques are well known in the art. And, each of the two sealed ends 11, 12 of the luminous tubes 10 is formed as a square tab adapted to engage with a socket of a lamp holder of an external fixture. It is worth to mention that the structure of the luminous tube 10 is the same as the conventional 1000 W high pressure sodium lamp, so the double-ended ceramic metal halide of the present invention can be installed on the ballast and fixture designed for the conventional 100 W high pressure sodium lamp, so no additional ballasts and fixtures are required to purchase in order to replace the 1000 W high pressure sodium lamp to 945 W double-ended ceramic metal lamps.

The high intensity discharge lamp further comprises a first terminal 40 and a second terminal 50 formed on two sealed ends 11, 12 of the luminous tubes 10, and two electrical leads 41, 51 are extended from the two opposed ends 201, 202 of the illuminators 20 through the first and second terminals 40, 50 respectively. The two electrodes of each of the illuminators 20 are serially connected with each other to form the two opposed ends 201, 202 of the illuminators, and are connected through the two sealed ends 11, 12 of the illuminous tubes 10 to two electrical leads 41, 51 respectively.

Accordingly, the U-shaped connectors 30 are arranged on two opposed ends 201, 202 of each of the illuminators 20, wherein each of the U-shaped connectors 30 provides a buffering clearance between the two illuminators 20, so a buffering force is provided from each of the U-shaped connector 30. During the manufacturing of the high intensity discharge lamp of the present invention, the U-shaped connectors 30 are adapted to reinforce serially connections between each of the illuminators 20, and further prevent the break of the connections between each of the illuminators 20 due to the buffering force generated from the U-shaped connectors 30.

The high intensity discharge lamp further comprises at least two getters 60, wherein each of the getters 60 is arranged between two illuminators 20 and attached on one of the U-shaped connectors 30 arranged between two illuminators 20. Therefore, the U-shaped connectors 30 can define a supporting surface to provide the getters 60 attached thereon, and the getters 60 are adapted to absorb excess hydrogen, so as to protect the function of the high intensity discharge lamp of the present invention.

Accordingly, the high intensity discharge lamp further comprises at least two ring-shaped retainers 70 connected between two U-shaped connectors 30, wherein each of ring-shaped retainers 70 is extended through one of the U-shaped connectors 30 to the other of the U-shaped connectors 30 to bias against an inner wall of the luminous tube 20. In order to prevent the damage of the illuminators 20 and the luminous tube 10, the illuminators 20 are required to arrange along a central line of the luminous tube 10, so the ring-shaped retainers 70 are adapted to support the illuminators 20 arranged along the central line of the luminous tube.

Figure 7:
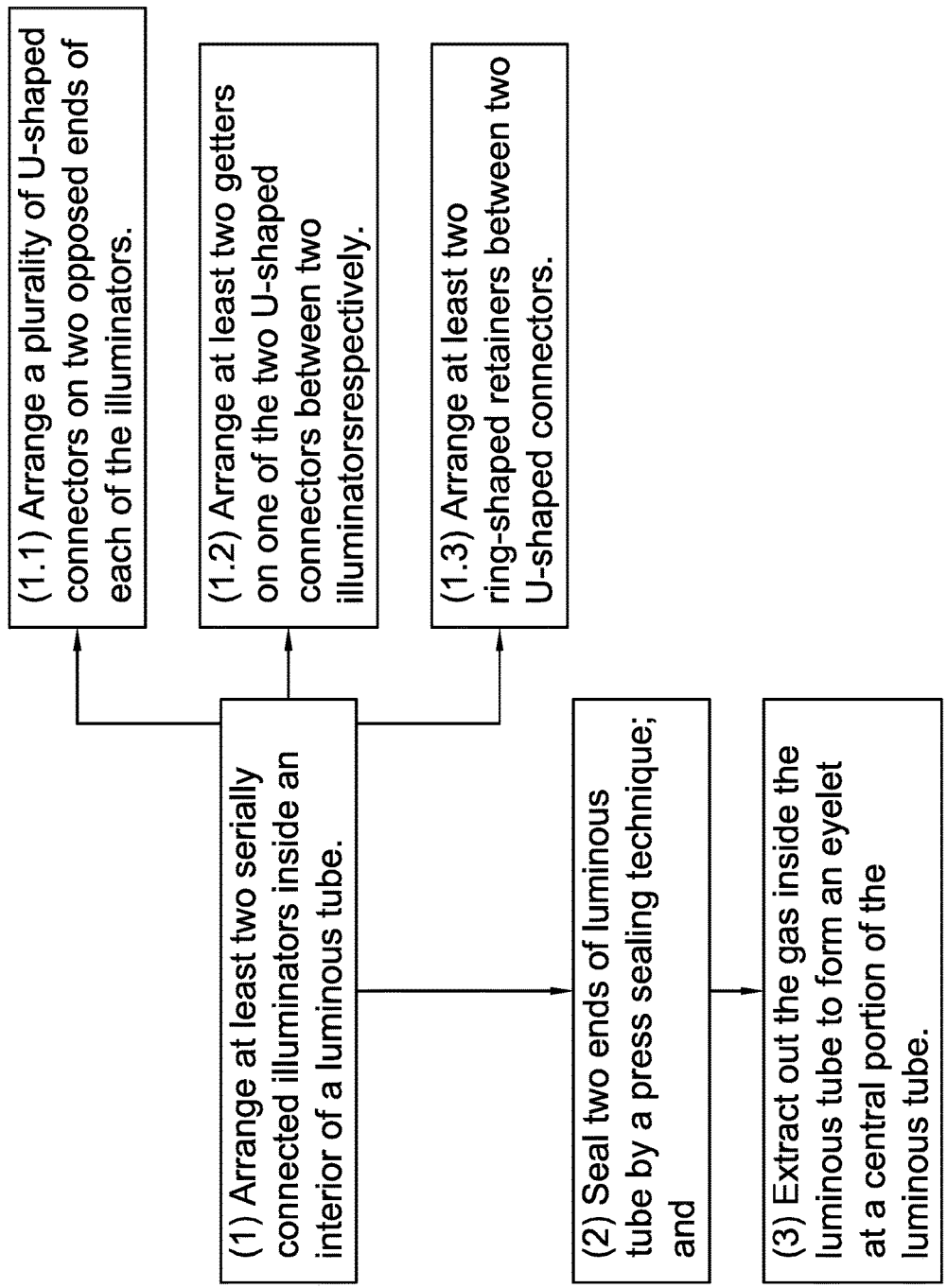
FIG. 7 is a block diagram of a manufacturing method of the double-ended high intensity discharge lamp according to the above first preferred embodiment of the present invention.
Figure 8:
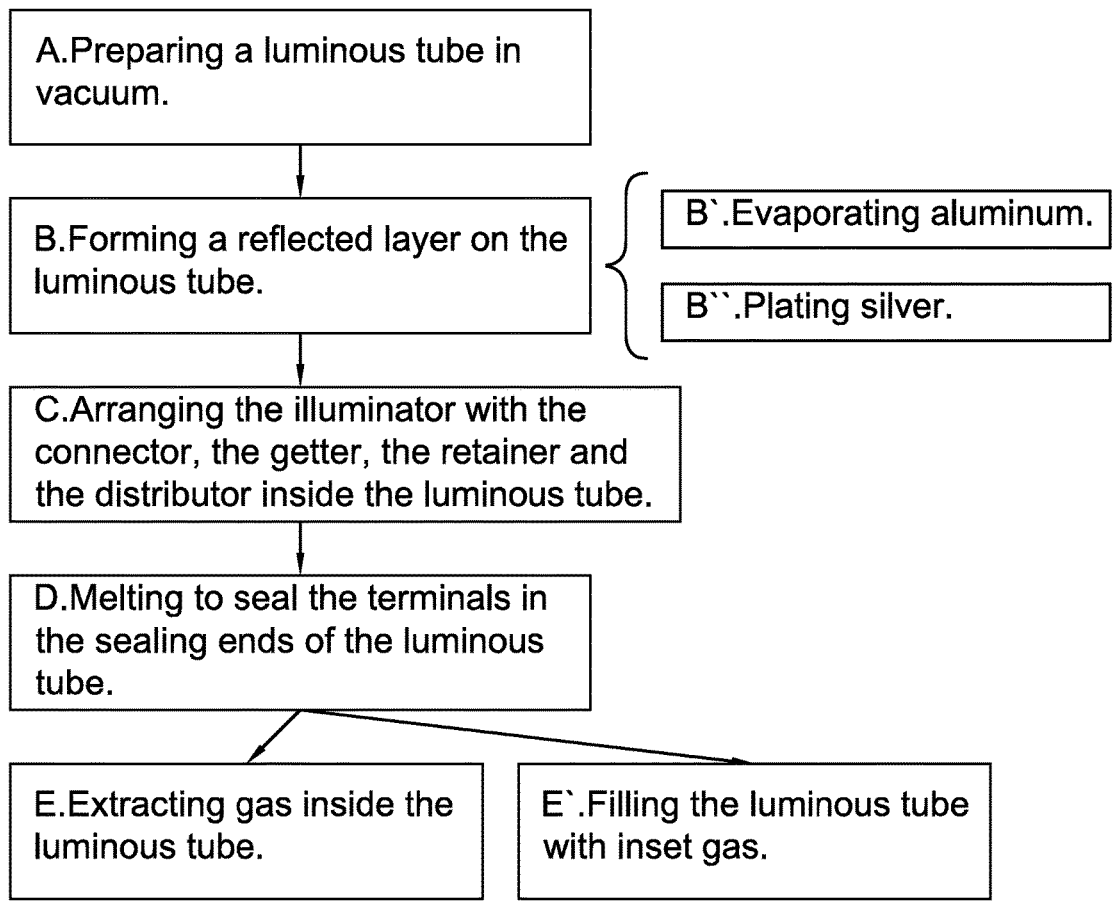
FIG. 8 is a block diagram of a manufacturing method of the double-ended high intensity discharge lamp according to the above second preferred embodiment of the present invention.

A manufacturing method for a high intensity discharge lamp according to a second preferred embodiment of the present invention is illustrated as in FIG. 7, wherein the manufacturing method comprises following steps:

(1) Arrange at least two serially connected illuminators 20 inside an interior of a luminous tube 10;

(2) Seal two ends of luminous tube 10 by a press sealing technique; and (3) Extract out the gas inside the luminous tube 10 to form an eyelet 102 at a central portion of the luminous tube 10.

In the step (1), the illuminators 10 are arc-tubes, which are ceramic hadlide discharge tube, and which comprises an ionizable fill disposed in an interior space of the illuminators 20, the ionizable fill comprising an inert gas and a halide component, and two electrodes positioned within the discharge vessel so as to energize the fill when an electric current is applied thereto.

Accordingly, the manufacturing method further comprises a step (1.1): Arrange a plurality of U-shaped connectors 30 on two opposed ends of each of the illuminators 20, wherein the U-shaped connectors 30 not only provide electrical connection between each of the illuminators 20, but also provide buffering clearances between the two illuminators 20, so a buffering force is provided from each of the U-shaped connectors 30. During the manufacturing of the high intensity discharge lamp of the present invention, the U-shaped connectors 30 are adapted to reinforce serially connections between each of the illuminators 20, and further prevent the break of the connections between each of the illuminators 20 due to the buffering force generated from the U-shaped connectors 30.

Accordingly, the manufacturing method further comprises a step (1.2): Arrange at least two getters 60 on one of the two U-shaped connectors 30 between two illuminators 20 respectively. Therefore, the U-shaped connectors 30 can define a supporting surface to provide the getters 60 attached thereon, and the getters 60 are adapted to absorb excess hydrogen, so as to protect the function of the high intensity discharge lamp of the present invention.

Accordingly, the manufacturing method further comprises a step (1.3): arrange at least two ring-shaped retainers 70 between two U-shaped connectors 30, wherein each of ring-shaped retainers 70 is extended through one of the U-shaped connectors 30 to the adjacent U-shaped connectors 30 to be biased against an inner wall of the luminous tube 10. In order to prevent the damage of the illuminators 20 and the luminous tube 10, the illuminators 20 are required to arrange along a central line of the luminous tube 10, so the ring-shaped retainers 70 are adapted to support the illuminators 20 arranged along the central line of the luminous tube 10.

In the step (2), each of the illuminators 20 has two opposed ends 201, 202 to receive current from the U-shaped conductors 30. The illuminators 20 are surrounded by the luminous tube 10, and two sealed ends 11, 12 of the luminous tube 10 are selectively connected with a source of power, such as voltage.

In the step (2), each of the two sealed ends 11, 12 of the luminous tubes 10 are formed as square tabs adapted to engage with a socket of a lamp holder of an external fixture. The press sealing techniques are well known in the art.

In the step (3), the interior of the luminous tube 10 is a vacuum space to insulate the illuminators.

Figure 2:
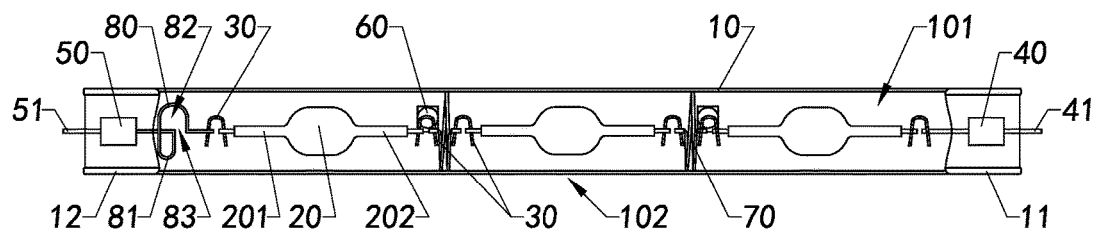
FIG. 2 is a sectional view of the double-ended high intensity discharge lamp according to the above first preferred embodiment of the present invention.

Furthermore, the double-ended high intensity discharge lamp further comprises a plurality of electrical elements which connected the illuminator 20 and supply power to the illuminator 20. As shown in FIG. 2, the electrical elements further comprise the connectors 30, the terminals 40, 50 and a distributor 80. It is worth to mention that the connectors 30 are connected the illuminator 20 with the terminals 40, 50 on each end 201, 202 of the illuminator 20. And the connector 30 is electrically supplied power to the illuminator 20. The terminals 40, 50 are preferably to be ballasts for the illuminator 20 which helps conduct electrical power for the illuminator 20 operating. The distributor 80 is disposed between the connector 30 and one of the terminals 40, 50 in the embodiment.

Figure 3:
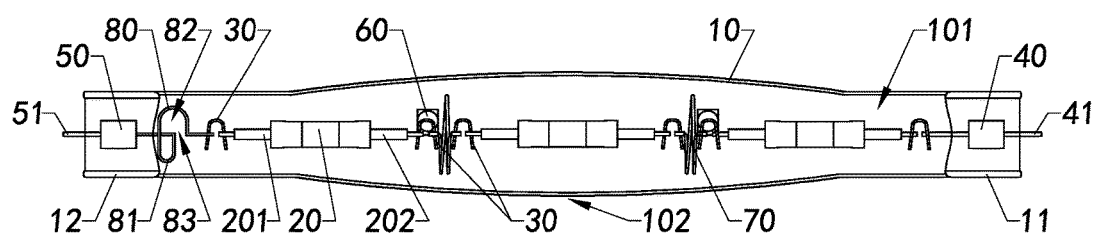
FIG. 3 is a sectional view of an alternative mode of the double-ended high intensity discharge lamp according to the above first preferred embodiment of the present invention.

As shown in FIG. 2 and FIG. 3, the distributor 80 is extended from the terminal 40 to the connector 30 on the end of the illuminator 20. The distributor 80 further comprises at least two curved stress distributing arms 81 which forms at least two distributing cavities 82 respectively. The distributing arms 81 are integrally formed in curved line shape extended from the connector 30 to the terminal 40. As the temperature inside the luminous tube 10 is changed by operating of the illuminator 20, the distributing arms 81 are pulled or pushed to change the volume of the distributing cavities 82 for buffering the stretching stress caused by heat expansion and contraction. Each of the distributing arms 81 is shaped in U-type with a distributing opening 83 to communicate the distributing cavity 82. In other words, the distributing opening 83 can be stretched instead of the illuminator 20 during changing temperature.

In the embodiment, there are two distributing arms 81 disposed against with each other with the distributing arms 81 in substantial spiral shape. As the illuminator 20 is bearing the heat expansion and contraction, the force applied on the illuminator 20 is transformed on the distributing arms 81. Therefore, the illuminator 20 is protected during operation to avoid being stretched to be damaged.

The illuminators 20, in the embodiment, are ceramic metal halide lamps as shown in FIG. 1 and FIG. 2. In an alternative mode of the embodiment, the illuminators 20 are high pressure sodium lamps, which the luminous tube 10 and the electrical members are correspond to the type of the illuminators 20. As in FIG. 3, the retainers 70 are supporting the illuminators 20 to be steady inside the luminous tube 10 with the terminals 40, 50 sealed in the sealing ends 11, 12. The illuminators 20 are hold by the retainers 70 to have relatively static stability against the luminous tube 10 and by the connectors 30 and the distributor 80 to have dynamic stability against with each other while operated. The connectors 30, the terminals 40, 50 and the distributor 80 are preferably made of conductive metal.

Figure 4:
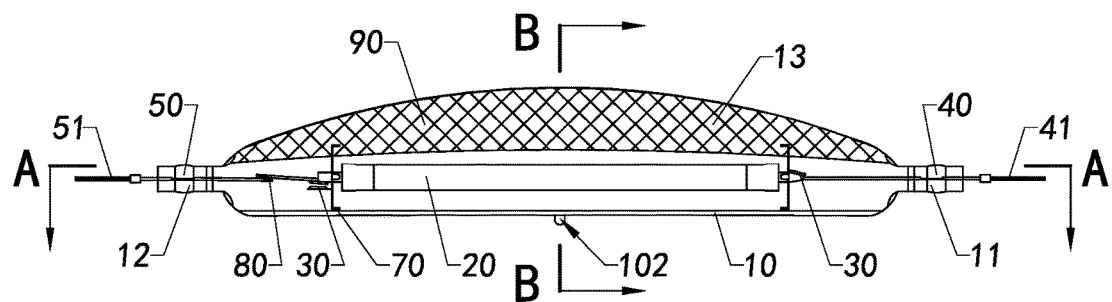
FIG. 4 is a sectional view of a double-ended high intensity discharge lamp according to a second preferred embodiment of the present invention.
Figure 5:
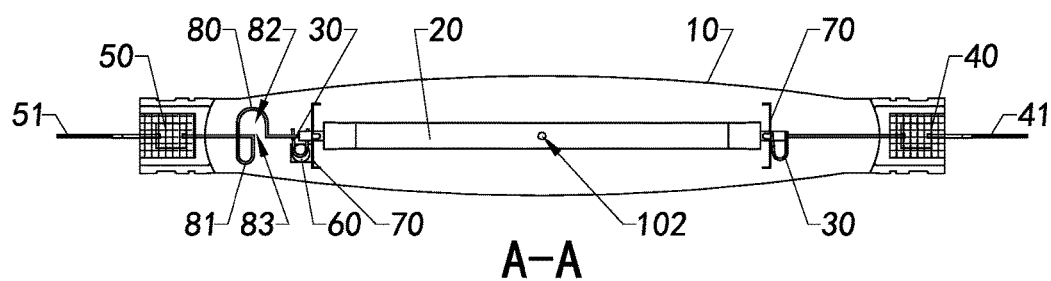
FIG. 5 is a top view of the double-ended high intensity discharge lamp according to the above second preferred embodiment of the present invention.
Figure 6:
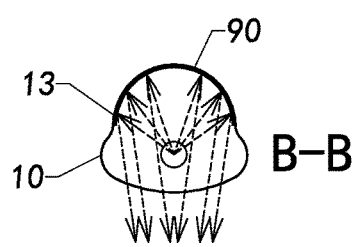
FIG. 6 is end view of the double-ended high intensity discharge lamp illustrating the reflection direction of the light according to the above second preferred embodiment of the present invention.

The second preferred embodiment of the present invention is illustrated in FIG. 4 to FIG. 6. The luminous tube 10 is shaped similar to baguette with quartz. The number of the illuminator 20 is one unlike the above embodiment. However, the illuminator 20 is supported by the retainer 70 and connected with the connectors 30 to the terminal 40, 50 which is similar to the above embodiment.

It is worth to mention that the shape of the retainer 70 is preferably to be adapted for the luminous tube 10 to be supported against the inner surface of the luminous tube 10. The retainer 70 is a substantially ellipse frame to hold the illuminator 20 in the center of the luminous tube 10. And two getters 60 is mounted on two opposite ends of the illuminator 20 to be adapted to absorb excess hydrogen. Since the retainers 70 are preferably disposed near the ends of the illuminator 20, the getters 60 is adapted to be set near the retainers 70.

In order to avoid damaging the illuminator 20 in changing temperature, at least one distributor 80 is preferably extended from one of the terminals 40, 50 to the connector 30 for being stretched along line A-A in FIG. 4 and FIG. 5. Furthermore, the eyelet 102 is positioned on the center of the luminous tube for better extracting the gas effectively to form vacuum inside the luminous tube 10. The eyelet 102 is sealed after forming vacuum environment.

Referring to FIG. 4 and FIG. 6, the double-ended high intensity discharge lamp according to a second preferred embodiment of the present invention further comprises a reflecting layer 90 provided on at least a portion of the luminous tube 10 to reflect the light emitted from the illuminator 20 towards the reflective layer 90 to project the light in a predetermined angle.

It is worth mentioning that light is emitted from the illuminator 20 from all direction. Therefore, generally, only half of the light emitted from the double-ended high intensity discharge lamp installed to the ceiling is directing downwards for growing corps or other plants, while another half of the light is generally directing upwards to the ceiling and wasted.

According the second preferred embodiment of the present invention, as shown in FIG. 4 and FIG. 6, the reflecting layer 90 is provided on one side of the luminous tube 10 such that the light emitting from the illuminator 20 towards that side will be reflected by the reflecting layer 90 to combine with the light emitting towards another opposing side of the luminous tube 10 so as to project as much light emitted from the illuminator 20 towards a desired direction, i.e. the another opposing side, as possible.

In particular, the reflecting layer 90 can be attached, mounted or coated to cover about half of the luminous tube 10, for example the upper side of the luminous tube 10 when the lamp is installed to a ceiling. In other words, the reflecting layer 90 is provided on the upper side of the luminous tube 10 facing the ceiling, so that the light emitted towards the upper side of the luminous tube 10 and the ceiling is reflected downwards to combine with the light emitted towards the lower side of the luminous tube 10 and project downwards.

According to the second preferred embodiment of the present invention, one side of the luminous tube 10 forms a reflective portion 13 having an arc-shape and a curvature provided with respect to the reflecting layer 90 for light reflection, as shown in FIGS. 4 and 6. The reflecting layer 90 is preferred to be attached or coated on an inner surface of said reflective portion 13 of the luminous tube 10 to avoid being scratched and leaking light through the reflecting layer 90. According to an alternative mode of the invention, the reflecting layer 90 is formed between the inner surface and an outer surface of the luminous tube 10 which is protected by the luminous tube 10. It is worth mentioning that the reflecting layer 90 is preferred to be extended between the two sealed ends of the luminous tube 10 axially and radially on the reflective portion 13.

In addition, in determination of the position of the reflective portion 13, the emitting angle of light and the material of the reflecting layer 90 are preferred to be taken into consideration. In one embodiment, the reflecting layer 90 is a film of aluminum or sliver which is capable of permanently covered the reflected portion 13. In other words, the reflected portion 13 is corresponding to the reflecting layer 90 which reflects the light as shown in FIG. 6 to project at desired area to use the light with high efficiency without scattering.

The manufacturing method the double-end high intensity discharge lamp of according to the second preferred embodiment of the present invention comprises the steps of:

A. preparing a luminous tube in vacuum;
B. forming a reflecting layer on the luminous tube;
C. arranging the illuminator with the connector, the getter, the retainer and the distributor inside the luminous tube; and
D. melting to seal the terminals in the sealing ends of the luminous tube.

After the step D, the manufacturing method further comprises a step of:

E. extracting gas inside the luminous tube.

To manufacture the high intensity discharge lamp, the luminous tube 10 should firstly be prepared in vacuum, which is in order to make an oxygen-free environment. Then, the reflecting layer 90 is formed on the luminous tube 10. In one embodiment, the reflecting layer 90 is preferably attached or coated on the inner surface of the luminous tube 10. More specifically, the step B further comprises a step B' of evaporating aluminum. The step B' is to form the reflecting layer 90 of aluminum in a predetermined thickness on the inner surface of the luminous tube 10. It is worth to mention that the aluminum is in gaseous state to be solidified in the oxygen-free environment. In an alternative mode of the method, the step B further comprises a step B" of plating silver. The step B" is to permanently form the silver layer on the luminous tube 10.

After the reflecting layer 90 has been provided and formed on the luminous tube 10, it is to arrange the illuminator 20 with the connector 30, the getter 60, the retainer 70 and the distributor 80 inside the luminous tube 10. In other words, the electrical members are mounted inside the luminous tube 10. Finally, melting to seal the terminals 40, 50 in the sealing ends of the luminous tube. It is worth to mention that the electrical leads 41, 51 is extended from the terminals 40, 50 to the outside of the luminous tube 10 while the terminals 40, 50 is sealedly mounted in the sealing ends 11, 12 with sealing the luminous tube 10.

There is no requirement in the step C or D being in oxygen-free environment, but the interior 101 of the luminous tube 10 has to be inserted as product for the illuminator 20. So, the manufacturing method of the second preferred embodiment of the present invention may further comprises the step E of making the interior 101 without oxygen. In an alternative mode of the second preferred embodiment, the manufacturing method may further comprise a step E' of filling the luminous tube with inset gas. The step E' is a substitute for step E which is also operated via the eyelet 102 to keep the inner environment in inert condition.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A manufacturing method of double-ended high intensity discharge lamp, comprising the steps of:
    (a) preparing a luminous tube in vacuum;
    (b) forming a reflecting layer on at least a reflective portion on one side of said luminous tube;
    (c) arranging an illuminator with at least two connectors, a getter, at least two retainers and a distributor inside said luminous tube; and
    (d) melting to seal at least two terminals in two sealing ends of said luminous tube.

2. The manufacturing method, as recited in claim 1, wherein the step (b) further comprises a step of covering said reflective portion of said luminous tube with said reflecting layer such that light emitted from said illuminator towards said side is reflected by said reflecting layer to combine with the light emitted towards another opposing side of said luminous tube so as to project towards said another opposing side.

3. The manufacturing method, as recited in claim 2, wherein said reflective portion on said side of said luminous tube has an arc-shape and a curvature provided with respect to said reflecting layer, wherein said reflecting layer is attached on said inner surface of said reflective portion of said luminous tube.

4. The manufacturing method, as recited in claim 2, wherein said reflective portion on said side of said luminous tube has an arc-shape and a curvature provided with respect to said reflecting layer, wherein said reflecting layer is formed between said inner surface and an outer surface of said reflective portion of said luminous tube.

5. The manufacturing method, as recited in claim 3, wherein said reflecting layer is extended between said two sealed ends of said luminous tube axially and radially on said reflective portion.

6. The manufacturing method, as recited in claim 4, wherein said reflecting layer is extended between said two sealed ends of said luminous tube axially and radially on said reflective portion.

7. The manufacturing method, as recited in claim 2, wherein the step (b) further comprises a step of evaporating aluminum to an inner surface of said reflective portion of said side of said luminous tube.

8. The manufacturing method, as recited in claim 2, wherein the step (b) further comprises a step of plating silver to an inner surface of said reflective portion of said luminous tube.

9. A double-ended high intensity discharge lamp, comprising:
a luminous tube; at least one illuminator supported inside said luminous tube;
a plurality of electrical members securely fastened in said luminous tube, wherein said electrical members are connected to said illuminator to supply power to operate said illuminator, wherein said electrical member further comprises at least two terminals permanently fixed in two sealing ends of said luminous tube respectively;
a reflecting layer provided on at least a portion of said luminous tube for reflecting light emitted from said illuminator towards said reflective layer to project the light in a predetermined angle, wherein said reflecting layer covers one side of said luminous tube such that the light emitted from said illuminator towards said side is reflected by said reflecting layer to combine with the light emitted towards another opposing side of said luminous tube so as to project towards said another opposing side, wherein said luminous tube has a reflective portion on said side, which has an arc-shape and a curvature provided with respect to said reflecting layer, wherein said reflecting layer is attached on said inner surface of said reflective portion of said luminous tube, wherein said reflecting layer is extended between said two sealed ends of said luminous tube axially and radially on said reflective portion; and
at least two retainers disposed against an inner surface of said luminous tube to hold said illuminator in a center of said luminous tube.

10. The double-ended high intensity discharge lamp, as recited in claim 9, wherein each of said electrical members further comprises at least one connector connecting said illuminator with said terminals on each end of said illuminator and a distributor disposed between said connector and one of said terminals to have dynamic stability of said illuminator against said luminous tube, wherein both said at least one connector and said distributor are made of conductive material.

11. The double-ended high intensity discharge lamp, as recited in claim 10, wherein said distributor further comprises at least two curved stress distributing arms which forms at least two distributing cavities respectively and said distributing arms are integrally formed in curved line extended from said connector to one of said terminals.

12. A double-ended high intensity discharge lamp, comprising:
a luminous tube;
at least one illuminator supported inside said luminous tube;
a plurality of electrical members securely fastened in said luminous tube, wherein said electrical members are connected to said illuminator to operate said illuminator, wherein said electrical member further comprises at least two terminals permanently fixed in two sealing ends of said luminous tube respectively;
a reflecting layer provided on at least a portion of said luminous tube for reflecting light emitted from said illuminator towards said reflective layer to project the light in a predetermined angle, wherein said reflecting layer covers one side of said luminous tube such that the light emitted from said illuminator towards said side is reflected by said reflecting layer to combine with the light emitted towards another opposing side of said luminous tube so as to project towards said another opposing side, wherein said luminous tube has a reflective portion on said side, which has an arc-shape and a curvature provided with respect to said reflecting layer, wherein said reflecting layer is formed between said inner surface and an outer surface of said reflective portion of said luminous tube, wherein said reflecting layer is extended between said two sealed ends of said luminous tube axially and radially on said reflective portion; and
at least two retainers disposed against an inner surface of said luminous tube to hold said illuminator in a center of said luminous tube.

13. The double-ended high intensity discharge lamp, as recited in claim 12, wherein each of said electrical members further comprises at least one connector connecting said illuminator with said terminals on each end of said illuminator and a distributor disposed between said connector and one of said terminals to have dynamic stability of said illuminator against said luminous tube, wherein both said at least one connector and said distributor are made of conductive material.

14. The double-ended high intensity discharge lamp, as recited in claim 13, wherein said distributor further comprises at least two curved stress distributing arms which forms at least two distributing cavities respectively and said distributing arms are integrally formed in curved line extended from said connector to one of said terminals.

15. A double-ended high intensity discharge lamp, comprising:
a luminous tube;
at least one illuminator supported inside said luminous tube;
a plurality of electrical members securely fastened in said luminous tube, wherein said electrical members are connected to said illuminator to supply power to operate said illuminator, wherein said electrical member further comprises at least two terminals permanently fixed in two sealing ends of said luminous tube respectively; and
a reflecting layer provided on at least a portion of said luminous tube for reflecting light emitted from said illuminator towards said reflective layer to project the light in a predetermined angle, wherein said reflecting layer covers one side of said luminous tube such that the light emitted from said illuminator towards said side is reflected by said reflecting layer to combine with the light emitted towards another opposing side of said luminous tube so as to project towards said another opposing side, wherein the reflecting layer is made of a reflective material selected from the group consisting of aluminum and silver.

* * * * *